US009500051B2

(12) United States Patent
Hall

(10) Patent No.: US 9,500,051 B2
(45) Date of Patent: Nov. 22, 2016

(54) METHOD AND APPARATUS FOR DRILLING AND COMPLETION FLUID SEPARATION

(75) Inventor: John Adrian Hall, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 631 days.

(21) Appl. No.: 13/572,299

(22) Filed: Aug. 10, 2012

(65) Prior Publication Data

US 2014/0041868 A1  Feb. 13, 2014

(51) Int. Cl.
*E21B 21/06* (2006.01)
*B01D 21/00* (2006.01)
*B01D 21/28* (2006.01)
*B01D 21/24* (2006.01)

(52) U.S. Cl.
CPC ......... *E21B 21/065* (2013.01); *B01D 21/0045* (2013.01); *B01D 21/2461* (2013.01); *B01D 21/283* (2013.01); *B01D 21/286* (2013.01); *B01D 2221/04* (2013.01)

(58) Field of Classification Search
CPC .. E21B 21/065; E21B 21/066; E21B 21/063; B01D 21/2405; B01D 21/02; B01D 21/0039
USPC ....... 175/66, 207; 210/744, 748.02; 166/267
See application file for complete search history.

(56) References Cited

U.S. PATENT DOCUMENTS

| | | | |
|---|---|---|---|
| 349,990 A * | 9/1886 | Gaillet et al. | 210/521 |
| 1,176,775 A * | 3/1916 | Morris | 210/521 |
| 4,104,168 A * | 8/1978 | Kiss | 210/297 |
| 4,604,196 A | 8/1986 | Lowrie et al. | |
| 4,741,443 A | 5/1988 | Hanrot et al. | |
| 5,947,299 A | 9/1999 | Vazquez et al. | |
| 6,907,996 B1 | 6/2005 | Fraas | |
| 7,571,817 B2 * | 8/2009 | Scott | B01D 33/0376 209/404 |
| 7,703,612 B2 * | 4/2010 | Browne | B01D 21/283 209/311 |
| 8,141,718 B2 | 3/2012 | Biester | |
| 2007/0108103 A1 | 5/2007 | Burnett | |
| 2009/0095690 A1 * | 4/2009 | McCabe | 210/744 |
| 2009/0260886 A1 | 10/2009 | Scott | |
| 2010/0089652 A1 * | 4/2010 | Burnett | 175/66 |
| 2010/0116753 A1 * | 5/2010 | Pruett et al. | 210/710 |
| 2011/0284475 A1 * | 11/2011 | Kolodny | 210/748.02 |
| 2012/0222854 A1 * | 9/2012 | McClung, III | 166/75.12 |

OTHER PUBLICATIONS

Omland, Tor Henry, "Particle Settling in non-Newtonian Drilling Fluids," Thesis submitted in fulfillment of the requirements for the degree of Doctor of Philosophy (PhD), University of Stavanger Faculty of Science and Technology, Department of Petroleum Engineering, 2009.
Hemphill, Terry, "Low Shear Rate Rheology: Clarifying Muddied Waters", AADE—02-DFWN-HO-14, 2002.

(Continued)

*Primary Examiner* — Michael Wills, III
(74) *Attorney, Agent, or Firm* — Tenley Krueger; Baker Botts L.L.P.

(57) ABSTRACT

A method and apparatus for separating drilling or completion fluids is described. The apparatus may include a fluid container that is operable to at least temporarily contain a drilling or completion fluid. The fluid container may have an inlet port and at least one outlet port. The apparatus may further include an excitation element. The excitation element may be operable to impart a pre-determined vibratory force on the drilling or completion fluid within the fluid container.

17 Claims, 4 Drawing Sheets

(56) References Cited

OTHER PUBLICATIONS

International Preliminary Report on Patentability issued in related PCT Application No. PCT/US2013/052561 mailed Feb. 10, 2015, 8 pages.

International Search Report and Written Opinion issued in related PCT Application No. PCT/US2013/052561 mailed Nov. 1, 2013, 12 pages.

Extended European Search Report issued in related European Patent Application No. 13827458.4, mailed May 10, 2016 (6 pages).

* cited by examiner

METHOD AND APPARATUS FOR DRILLING AND COMPLETION FLUID SEPARATION

BACKGROUND

The present disclosure relates generally to subterranean drilling operations and, more particularly, the present disclosure relates to a method and apparatus for drilling and completion fluid separation.

Subterranean drilling operations typically utilize drilling fluids to provide hydrostatic pressure to prevent formation fluids from entering into the well bore, to keep the drill bit cool and clean during drilling, to carry out drill cuttings, and to suspend the drill cuttings while drilling is paused and when the drilling assembly is brought in and out of the borehole. The drilling fluids are typically made of a base fluid with suspended particulate matter, otherwise known as additives, in ratios that depend on the particular drilling application. These ratios may control in part the density of the drilling fluid, or other rheological features of the drilling fluid, required for the drilling fluid to function correctly.

As the drilling fluid is cycled downhole, the drilling fluid may accumulate additional particulate matter that offsets the desired ratio. In such instances it is typically desirable to remove some or all of the particulate matter, to either restore the desired rheological properties, or to recover the base fluid and remix the desired drilling fluid. Existing methods to remove the particulate matter, however, are problematic. These existing methods include centrifugation, which is slow and requires frequent maintenance; physical filtration, which requires replacement and cleaning of easily clogged filter media; and thermal treatment, which is energy intensive and costly, and can cause the base oils and additives to breakdown. What is needed is a cost-effective, efficient, and easily implementable method and apparatus for drilling and completion fluid separation.

FIGURES

Some specific exemplary embodiments of the disclosure may be understood by referring, in part, to the following description and the accompanying drawings.

Figure 1:
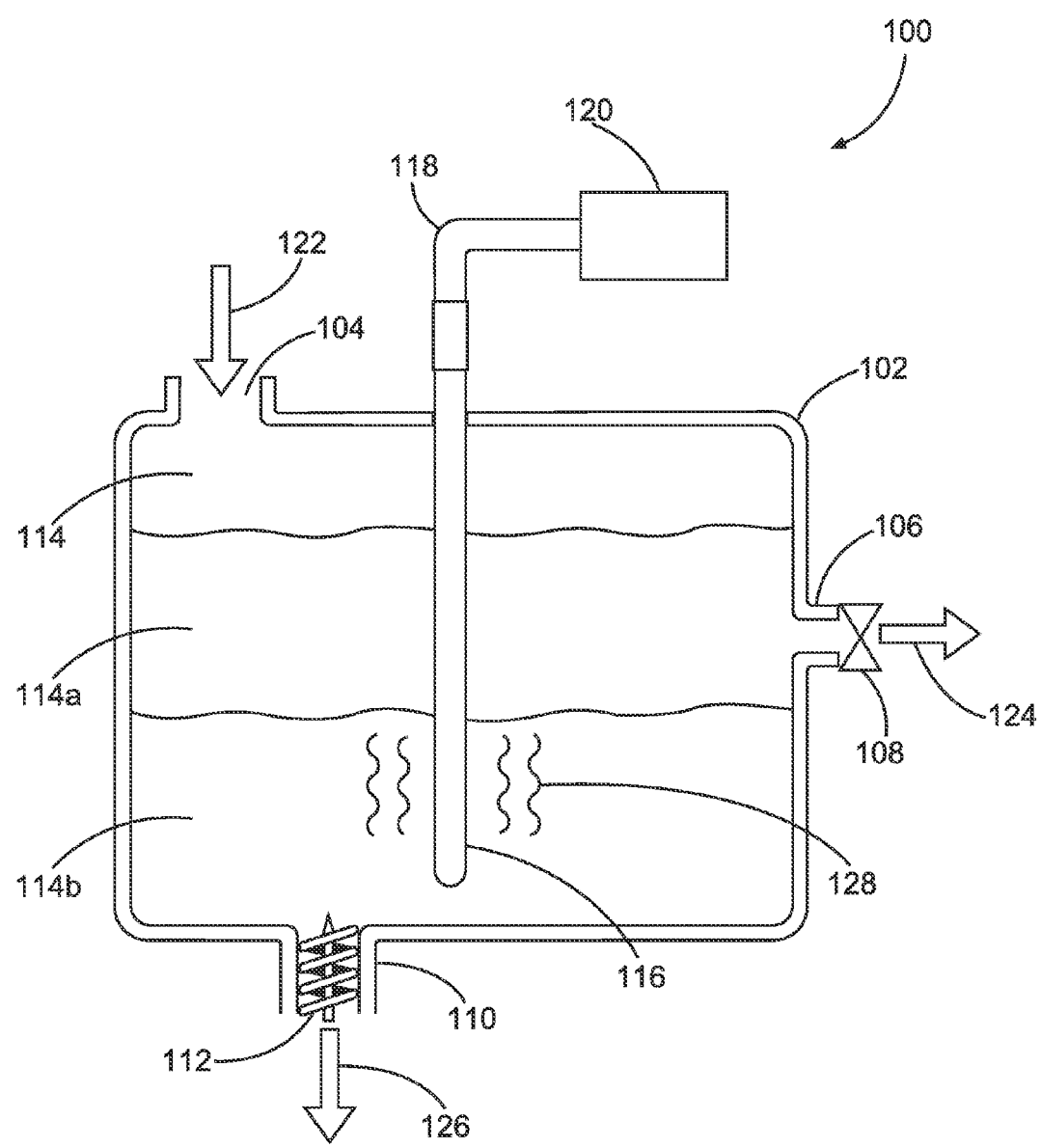
FIG. 1 illustrates an example fluid separation apparatus, according to aspects of the present disclosure.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

The present disclosure relates generally to subterranean drilling operations and, more particularly, the present disclosure relates to a method and apparatus for drilling and completion fluid separation.

Illustrative embodiments of the present disclosure are described in detail herein. In the interest of clarity, not all features of an actual implementation may be described in this specification. It will of course be appreciated that in the development of any such actual embodiment, numerous implementation-specific decisions must be made to achieve the specific implementation goals, which will vary from one implementation to another. Moreover, it will be appreciated that such a development effort might be complex and time-consuming, but would nevertheless be a routine undertaking for those of ordinary skill in the art having the benefit of the present disclosure.

The present application is directed to a method and apparatus for drilling and completion fluid separation. Drilling fluids may include, but are not limited to, dispersed or non-dispersed water-based muds, non-aqueous or oil-based muds, foamed drilling fluid, and gaseous drilling fluid, all made from a variety of base fluids and additives of different chemical, fluid, and solid formulations that would be appreciated by one of ordinary skill in the art in view of this disclosure. Completion fluids may include, but are not limited to, brines comprising chlorides, bromides and formates, but could be any fluid of proper density and flow characteristics.

An apparatus according to embodiments of the present disclosure may include a fluid container with an inlet port, a base fluid port and a particulate port. The fluid container may be operable to at least temporarily contain a drilling or completion fluid. An excitation element may be coupled to and impart a pre-determined vibratory force on drilling or completion fluids located within the fluid chamber. In certain embodiments, the excitation element may comprise a vibrating probe at least partially disposed within the fluid container. In other embodiments, the excitation element may comprise a vibrating motor coupled to the fluid container. As will be discussed below, the pre-determined vibratory force may comprise at least one of a shape, an intensity, and a frequency; and may be, based, at least in part, on at least one of a rheological characteristic, a particle size, and a density of the drilling or completion fluid.

In certain embodiments, the pre-determined vibratory force may cause a drilling or completion fluid located in the fluid container to separate into a base fluid portion and a particulate portion. The particulate portion may be a sludge that is separated from the base fluid, and may include at least some trace amounts of the base fluid that have not been fully separated. The base fluid portion and the particulate portion may be removed from the fluid container separately. In certain embodiments, the separated base fluid may be removed through the base fluid port, and the particulate portion may be removed through the particulate port, using, for example, a slow-turn auger coupled to the particulate port.

In certain embodiments, either alone or in combination with the excitation element, the fluid container may comprise a pipe through which the drilling or completion fluid flows. The pipe may be inclined at a pre-determined incline angle, such as between 20° to 60°. The pre-determined incline angle may be based, at least in part, on at least one of a rheological characteristic, a particle size, and a density of the drilling or completion fluid. Positioning the fluid container at an angle may facilitate separation by utilizing the Boycott effect. In particular, when an emulsion, such as a drilling fluid, travels downward in an inclined pipe or fluid container, the solid particles and additives settle downward. As the particles settle, the low-density fluids within the emulsion move upwards, while the high-density fluids move downward along the low-side of the pipe. This can create a pressure imbalance that can accelerate the fluid movement and separation process.

FIG. 1 illustrates an example drilling or completion fluid separation apparatus 100, according to aspects of the present disclosure. The apparatus 100 includes a fluid container 102. The fluid container 102 need not be designed to store fluids for an extended period of time, and may include a body made of suitable material, such as metal, that is capable of at least temporarily holding drilling or completion fluid 114 during a separation process. The drilling or completion fluid 114 may be introduced into the fluid container 102 though the inlet port 104, as indicated by arrow 122. The inlet port 104 may comprise an opening in the fluid container 102, with or without a protrusion, that allows fluid communication with the interior of the fluid container 102.

The apparatus 100 may further comprise an excitation element 116, which may impart a vibratory force to the contents of the fluid container 102. In FIG. 1, the excitation element 116 comprises a vibrating probe at least partially disposed within the interior of the fluid container 102. As can be seen, the vibrating probe 116 imparts a vibratory force directly to the drilling or completion fluid 114, as indicated by lines 128. The pre-determined vibratory force 128 may include at least one of an intensity, shape, and frequency that is based, at least in part, on at least one of a rheological characteristic, a particle size, and a density of the drilling or completion fluid 114. The intensity of the pre-determined vibrating force may correspond to the peak-to-peak measurement of the vibratory wave imparted on the drilling or completion fluid. The shape of the pre-determined vibrating force may correspond to the shape of the vibratory wave, such as sinusoidal, imparted on the drilling or completion fluid. The frequency of the pre-determined vibrating force may correspond to the peak-to-peak frequency of the vibratory wave imparted on the drilling or completion fluid. Rheological characteristics may include, for example, fluid viscosity, etc. A particle size of the drilling or completion fluid may comprise the average diameter of the particle suspended within the drilling or completion fluid.

In certain embodiments, a shape, intensity, or frequency of the vibratory force may be selected to maximize the separation of the base fluid and particulates of the drilling or completion fluid 114. For example, depending on the composition of the drilling or completion fluid 114, the drilling or completion fluid may separate more effectively when a sinusoidal vibratory wave with a small intensity and high frequency is applied. Likewise, other base fluid and particulate compositions of the drilling or completion fluid 114 may separate more effectively when a sinusoidal vibratory wave with a larger intensity and a lower frequency is applied, or a vibratory force with a different shape is applied. The shape, intensity, and frequency of a pre-determined vibratory force corresponding to a particular base fluid and particulate composition would be appreciated by one of ordinary skill in the art in view of this disclosure.

As can be seen, vibrating probe 116 may be inserted into the interior of the fluid container 102 through an opening at the top of the fluid container 102. Although FIG. 1 shows a dedicated opening, the vibrating probe 116 could be inserted at other location, such as through the inlet port 104. Additionally, the vibrating probe 116 may be coupled to a control unit 120 through a connection 118. The pre-determined vibratory force 128 imparted on the drilling or completion fluid 114 by the vibrating probe 116 may be determined or set within the control unit 120, which may then control the operation of the vibrating probe 116. For example, the control unit 120 may have a look-up table containing commands for pre-determined vibratory forces that correspond to particular rheological characteristics, particle sizes, and densities of the drilling or completion fluid to be introduced into the fluid container 120. The rheological characteristics, particle sizes, and densities of the drilling or completion fluid may be measured separately and input into the control unit, or may be made as part of an automated system in which the control unit 120 controls the measurement process and automatically receives the measurements. The control unit 120 may then select a particular pre-determined vibratory force based on at least one of the measured rheological characteristics, particle sizes, and densities. In other embodiments, the pre-determined vibratory force may be set manually. In certain embodiments, the characteristics of the vibratory force 128 may be changed according to the composition of the drilling or completion fluid 114 presently in the fluid container 102, or according to the characteristics of the separated portions of the drilling or completion fluids as they are removed from the fluid container 102. For example, the control unit 120 may incorporate a feedback function and alter the pre-determined vibratory force based on the rheological characteristics, particle sizes, and densities of the separated base fluid.

The vibratory force 128 may cause the drilling or completion fluid 114 to separate into a base fluid portion 114a and a particulate portion 114b, containing additives or drill cuttings, for example. The apparatus 100 may comprise at least one outlet port in the fluid container 102, which may be operable to remove the separated contents of the drilling or completion fluid 104. In certain embodiments, the at least one outlet port may comprise a base fluid port 106. The base fluid port 106 may comprise an opening in the fluid container 102, with or without a protrusion, operable to separately remove from the fluid container 102 the base fluid portion 114a of the drilling or completion fluid 114. As can be seen, the base fluid port 106 may be coupled to a valve 108, and may be positioned on the fluid container 102 such that it provides fluid communication with the separated base fluid portion 114a of the drilling or completion fluid. The base fluid portion 114a may be removed through the base fluid port 106, as indicated by arrow 124. Although the base fluid port 106 is operable to remove base fluids, the separation method may be imperfect, meaning that the base fluid portion 114a may retain some additives or other particulate matter, as would be appreciated by one of ordinary skill in the art. Calling port 106 the base fluid port does not imply that only perfectly pure base fluids may be removed through the port.

In certain embodiments, the at least one outlet port may further comprise a particulate port 110 through the fluid container 102. The particulate port 110 may comprise an opening in the fluid container 102, with or without a protrusion, operable to separately remove from the fluid container 102 the particulate portion 114b of the drilling or completion fluid 114. As can be seen, the particulate port 110 may be coupled a slow-turn auger 112, and may be positioned on the fluid container 102 such that it provides fluid communication with the particulate portion 114b of the drilling or completion fluid 114. The particulate portion 114b may be removed through the particulate port 110, as indicated by arrow 126. Although the particulate port 106 is operable to remove separate particulates from the drilling or completion fluid 114, the separation method may be imperfect, meaning that the particulate portion may retain some base fluid, as would be appreciated by one of ordinary skill in the art. Calling port 110 the particulate port does not imply that only pure particulates may be removed through the port. Once the base fluid portion 114a and particulate portion 114b are removed from the fluid container 102, they may be tested for various rheological and chemical characteristics that can be used later on, for example, to alter the composition of new drilling fluids. Likewise the separated base fluid portion may be itself remixed into a drilling or completion fluid.

Figure 2:
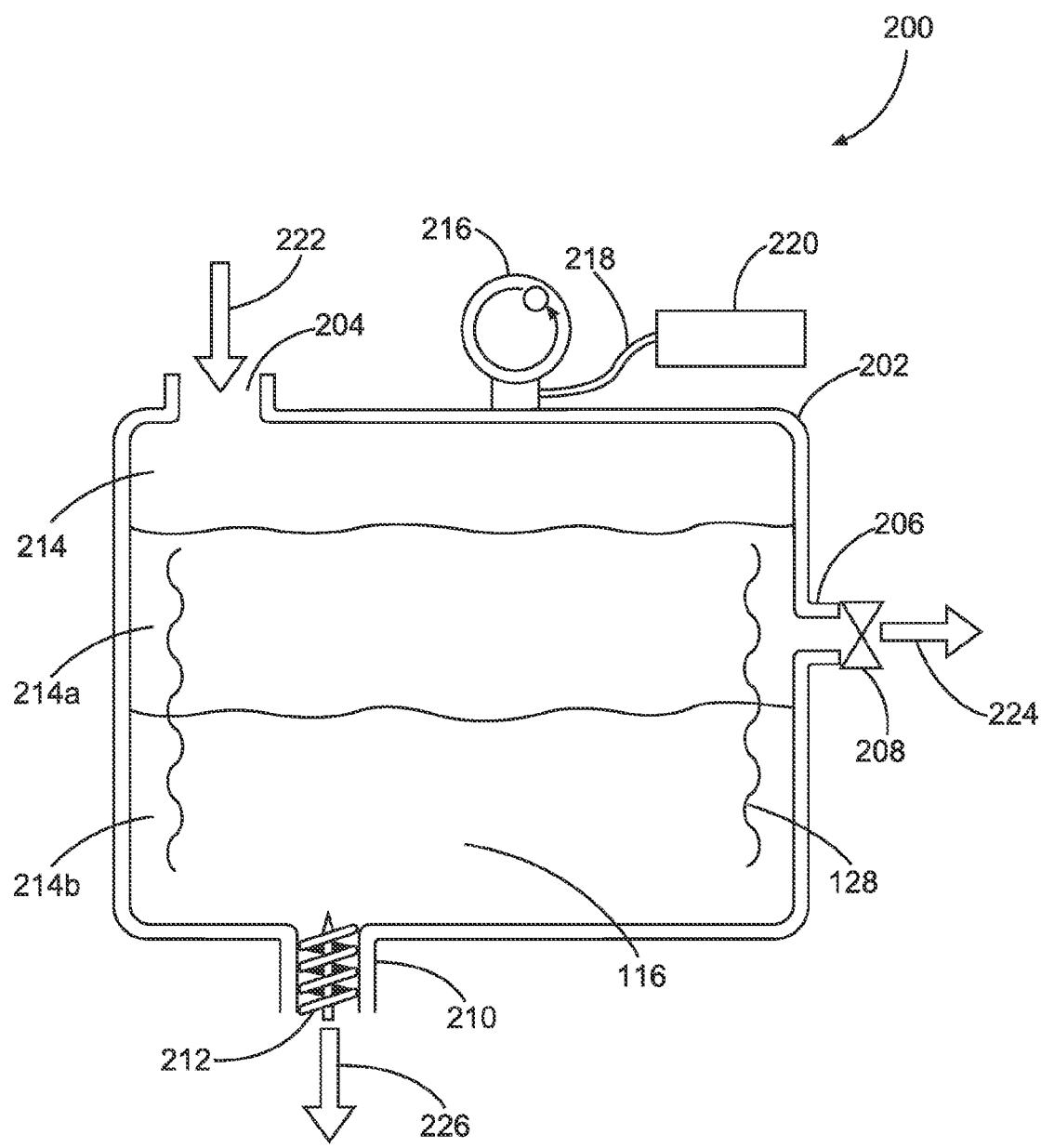
FIG. 2 illustrates an example fluid separation apparatus, according to aspects of the present disclosure.

FIG. 2 illustrates an example drilling or completion fluid separation apparatus 200, according to aspects of the present disclosure. The apparatus 200 is similar to the apparatus 100 in FIG. 1, with the exception of the excitation element 216. As can be seen, the apparatus 200 includes a fluid container 202 similar to the fluid container 102, and the fluid container 202 includes an inlet port 204 similar to inlet port 104. Unlike apparatus 100, the excitation element 216 comprises a vibrating motor coupled to an outer surface of the fluid container 102. The vibrating motor 216 may impart a pre-determined vibratory force to the fluid container 202, which is transferred to the drilling or completion fluid 214, as indicated by lines 228. Unlike the vibrating probe 116, which applies the pre-determined vibratory force directly to the drilling or completion fluid, the vibrating motor 216 applies the force indirectly through the fluid container 216. The pre-determined vibratory force 228 may have similar characteristics to the predetermined vibratory force described above. Additionally, the vibrating motor 216 may be coupled to a control unit 220 through a connection 218, with the control unit 220 having similar functionality as the control unit 120 described above.

The vibratory force 228 may cause the drilling or completion fluid 214 to separate into a base fluid portion 214a and a particulate portion 214b. The apparatus 200 may comprise at least one outlet port in the fluid container 202, which may be used to remove the separated contents of the drilling or completion fluid 204. In certain embodiments, the at least one outlet port may comprise a base fluid port 206. The base fluid port 206 may comprise an opening in the fluid container 202, with or without a protrusion, operable to separately remove from the fluid container 202 the base fluid portion 214a of the drilling or completion fluid 214. As can be seen, the base fluid port 206 may be coupled to a valve 208, and may be positioned on the fluid container 202 such that it provides fluid communication with the separated base fluid portion 214a of the drilling or completion fluid. The base fluid portion 214a may be removed through the base fluid port 206, as indicated by arrow 224.

In certain embodiments, the at least one outlet port may further comprise a particulate port 210 through the fluid container 202. The particulate port 210 may comprise an opening in the fluid container 202, with or without a protrusion, operable to separately remove from the fluid container 202 the particulate portion 214b of the drilling or completion fluid 214. As can be seen, the particulate port 210 may be coupled a slow-turn auger 212, and may be positioned on the fluid container 202 such that it provides fluid communication with the particulate portion 214b of the drilling or completion fluid 214. The particulate portion 214b may be removed through the particulate port 210, as indicated by arrow 226.

Figure 3:
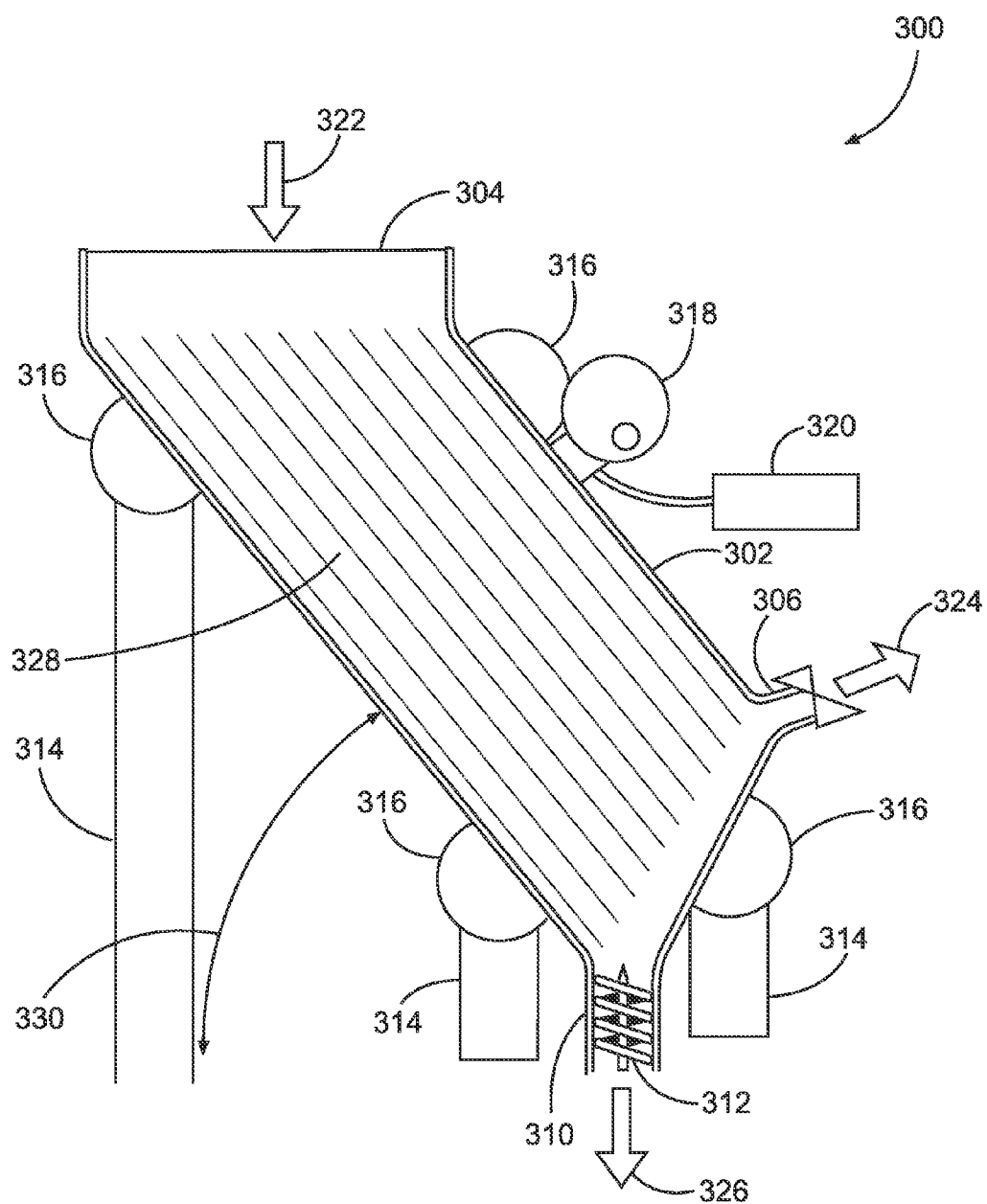
FIG. 3 illustrates an example fluid separation apparatus, according to aspects of the present disclosure.

FIG. 3 illustrates an example fluid separation apparatus 300, according to aspects of the present disclosure. The apparatus 300 functions similarly to apparatuses 100 and 200 described above, except that it is inclined at a pre-determined incline angle that may further facilitate separation of drilling or completion fluids. In particular, the apparatus 300 comprises a fluid container 302 inclined at a pre-determined incline angle 330. The apparatus 300 may comprise a pipe or have a generally cylindrical shape. The pre-determined incline angle 330 may be between 20° and 60° and may be based, at least on part, on at least one of a rheological characteristic, a particle size, and a density of a drilling or completion fluid. As described above with respect the FIGS. 1 and 2, the apparatus 300 need not be designed to store fluids for an extended period of time, and may include a body made of suitable material, such as metal, that is capable of at least temporarily holding a drilling or completion fluid during a separation process. The drilling or completion fluid may be introduced into the fluid container 302 though the inlet port 304, as indicated by arrow 322. The inlet port 304 may comprise an opening in the fluid container 302, with or without a protrusion, that allows fluid communication with the interior of the fluid container 302.

The apparatus 300 may further comprise an excitation element 318, which may impart a pre-determined vibratory force to the contents of the fluid container 302. In FIG. 3, the excitation element 318 comprises a vibrating motor coupled to an outer surface of the fluid container 302, similar to the vibrating motor 216 coupled to the fluid container 202 in FIG. 2. In certain embodiment, a vibrating probe similar to vibrating probe 116 may also be used. The vibrating motor 318 may be coupled to a control unit 320 through a connection 318, with the control unit 320 having similar functionality as the control units described above.

Like apparatuses 100 and 200, apparatus 300 may comprise at least one outlet port in the fluid container 302, which may be used to remove the separated contents of a drilling or completion fluid within the fluid container 302. In certain embodiments, the at least one outlet port may comprise a base fluid port 306. The base fluid port 306 may comprise an opening in the fluid container 302, with or without a protrusion, operable to separately remove from the fluid container 302 the base fluid portion of the drilling or completion fluid. As can be seen, the base fluid port 306 may be coupled to a valve. In certain embodiments, the at least one outlet port may further comprise a particulate port 210 through the fluid container 302. The particulate port 310 may comprise an opening in the fluid container 302, with or without a protrusion, operable to separately remove from the fluid container 302 a particulate portion of the drilling or completion fluid. As can be seen, the particulate port 310 may be coupled a slow-turn auger 312. The particulate portion may be removed through the particulate port 310, as indicated by arrow 326.

The fluid container 302 may be supported by at least one support mechanism. In the embodiment shown in FIG. 3, the support mechanism comprises support columns 314 and spring supports 316. The support mechanism may maintain the apparatus 300 at the pre-determined incline angle 330 during operation. The spring supports 316 may allow the fluid container 302 to vibrate, thereby separating the contents of the fluid container 302, while still securing the fluid container 302. In the embodiment shown, the fluid container 302 may comprise a tubular element, such as a pipe, and the support mechanisms may be coupled to an outer surface of the pipe.

In certain embodiments, the apparatus 300 may comprise at least one plate 328 disposed within the fluid container 302. In the embodiment shown, the fluid container includes a plurality of plates 328, each positioned parallel to the fluid container at the pre-determined angle 330. As drilling or completion fluid is introduced into the fluid container 302 through port 304, the drilling or completion fluid may flow along and between the plates 328. As described above, the Boycott effect may cause the particulates to settle and the low-density base fluid to float to the top of the drilling or completion fluid. The plurality of plates 328 provide multiple surfaces on which the Boycott effect may be utilized. As the drilling or completion fluid passes through the plates 328, and is vibrated by the vibrating motor 318, a base fluid portion of the drilling or completion fluid may float to the surface. The base fluid portion may then be extracted from the fluid container 302 using the base fluid port 306, as indicated by arrow 324. Likewise, as the drilling or completion fluid passes through the plates 328, and is vibrated by the vibrating motor 318, a particulate portion of the drilling or completion fluid may settle. The particulate portion may then be extracted from the fluid container 302 using the particulate port 310 and auger 312, as indicated by arrow 326.

Figure 4:
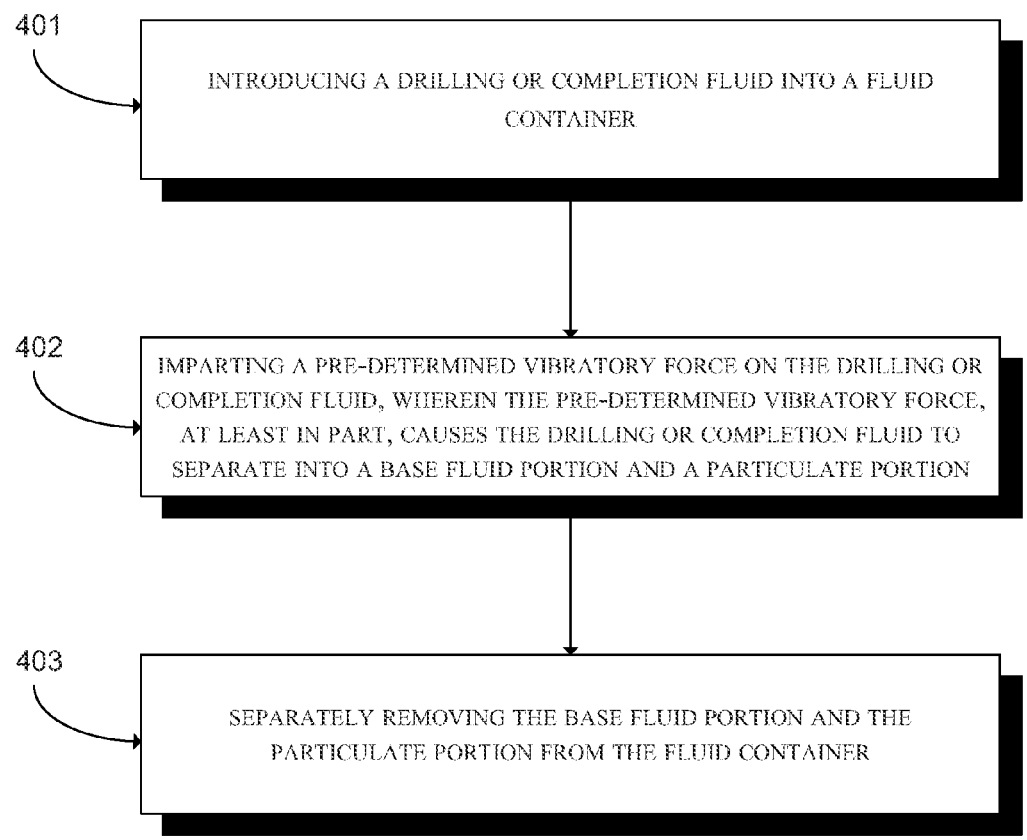
FIG. 4 illustrates an example method for separating drilling or completion fluids, according to aspects of the present disclosure.

Apparatuses similar to those discussed above with respect to FIGS. 1-3 may be used in a method to separate drilling or completion fluids, although such apparatuses are not required to practice the method. As shown in FIG. 4, the method may include introducing a drilling or completion fluid into a fluid container, as shown at step 401. The fluid container may at least temporarily hold the drilling or completion fluid during a separation process. Introducing the drilling or completion fluid into the fluid container may be an automated process, for example, when drilling fluid returns from the borehole. For example, the drilling fluid may be pumped into a holding tank after it returns to the surface, and the fluid container may be in fluid communication with the holding tank and separate the cuttings from the drilling fluid so that the drilling fluid may be returned downhole.

The method may further include imparting a pre-determined vibratory force to the drilling or completion fluid within the fluid container, at step 402. The pre-determined vibratory force may, in part, cause the drilling or completion fluid to separate into a base fluid portion and a particulate portion. As described above, the pre-determined vibratory force may include a shape, intensity, and frequency, one of which is based, at least in part, on at least one of a rheological characteristic, a particle size, and a density of the drilling or completion fluid. In certain embodiments, pre-determined vibratory forces for fluids with a variety of rheological characteristics, particle sizes, and densities may be determined, with the actual force imparted on the drilling or completion fluid being selected once certain rheological characteristics, particle sizes, and densities of the drilling or completion fluid are measured. For example, the drilling or completion fluid from the holding tank may go through an automated or manual measurement process whereby its rheological characteristics, particle sizes, and/or densities are measured. The measured rheological characteristics, particle sizes, and/or densities may then be used, for example, by a control unit to select from a list of pre-determined vibratory forces.

In certain embodiment, the fluid container may also be inclined at a pre-determined incline angle. Like the pre-determined vibratory force, the pre-determined incline angle may be based, at least in part on at least one of a rheological characteristic, a particle size, and a density of the drilling or completion fluid, and may be selected from a list of pre-determined incline angles according to a measured rheological characteristic, particle size, and/or density of the drilling or completion fluid. In certain embodiments, support members similar to support members 314 in FIG. 3 may be coupled to a control unit, with the control unit being operable to alter the incline angle of the fluid container by, for example, controlling hydraulic pumps and pistons within the support members. Other configurations for setting the incline angle of the fluid container are possible, as would be appreciated by one of ordinary skill in view of this disclosure.

The method may further include separately removing the base fluid portion and the particulate portion from the fluid container, at step 403. As described above, the vibratory forces or Boycott effect may cause the drilling or completion fluid to separate into a base fluid portion and a particulate portion. In certain embodiments, separately removing the base fluid portion and the particulate portion may comprise using different outlet ports for each portion. For example, separately removing the base fluid portion and the particulate portion may comprises removing the base fluid portion through a first outlet port in the fluid container, such as a base fluid port; and separately removing the particulate portion through a second outlet port in the fluid container, such as a particulate port. Once removed from the fluid container, both the base fluid portion and the particulate portion may be reused or tested. For example, the base fluid portion may undergo additional rheological tests through which the pre-determined vibratory force may be altered, acting as a feedback signal, or through which it is determined that the base fluid portion may be reused.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee. The indefinite articles "a" or "an," as used in the claims, are defined herein to mean one or more than one of the element that it introduces.

What is claimed is:

1. An apparatus for separating drilling or completion fluids, comprising:
    a fluid container, wherein the fluid container is operable to at least temporarily contain a drilling or completion fluid;
    an inlet port in the fluid container, wherein the inlet port comprises an opening in a top of the fluid container;
    at least one outlet port in the fluid container; and
    an excitation element, wherein the excitation element is operable to impart a pre-determined vibratory force on the drilling or completion fluid, wherein the pre-determined vibratory force comprises at least one of a shape, an intensity, and a frequency that is based, at least in part, on at least one of a rheological characteristic, a particle size, and a density of the drilling or completion fluid.

2. The apparatus of claim 1, wherein the excitation element comprises a vibrating probe at least partially disposed within the fluid container.

3. The apparatus of claim 1, wherein the excitation element comprises a vibrating motor coupled to the fluid container.

4. The apparatus of claim 1, wherein the fluid container is inclined at a pre-determined incline angle between 20° and 60°.

5. The apparatus of claim 4, wherein the pre-determined incline angle is based, at least in part, on at least one of a rheological characteristic, a particle size, and a density of the drilling or completion fluid.

6. The apparatus of claim 1, wherein:
the at least one outlet port comprises a base fluid port operable to remove from the fluid container a separated base fluid portion of the drilling or completion fluid; and
the at least one outlet port comprises a particulate port operable to remove from the fluid container a separated particulate portion of the drilling or completion fluid.

7. The apparatus of claim 6, further comprising an auger coupled to the particulate port.

8. A method for separating drilling or completion fluids, comprising:
introducing a drilling or completion fluid into a fluid container through an inlet port in the fluid container, wherein the inlet port comprises an opening in a top of the fluid container;
imparting a pre-determined vibratory force on the drilling or completion fluid, wherein the pre-determined vibratory force, at least in part, causes the drilling or completion fluid to separate into a base fluid portion and a particulate portion, and wherein the pre-determined vibratory force comprises at least one of a shape, an intensity, and a frequency that is based, at least in part, on at least one of a rheological characteristic, a particle size, and a density of the drilling or completion fluid; and
separately removing the base fluid portion and the particulate portion from the fluid container.

9. The method of claim 8, wherein the pre-determined vibratory force is imparted using a vibrating probe at least partially disposed within the fluid container.

10. The method of claim 8, wherein the pre-determined vibratory force is imparted using a vibrating motor coupled to the fluid container.

11. The method of claim 8, wherein the fluid container is inclined at a pre-determined incline angle between 20° and 60°.

12. The method of claim 11, wherein the pre-determined incline angle is based, at least in part, on at least one of a rheological characteristic, a particle size, and a density of the drilling or completion fluid.

13. The method of claim 8, wherein separately removing the base fluid portion and the particulate portion, comprises:
removing the base fluid portion through a first port in the fluid container; and
removing the particulate portion through a second port in the fluid container.

14. The method of claim 13, further comprising an auger coupled to the second port.

15. An apparatus for separating drilling or completion fluids, comprising:
a fluid container inclined at a pre-determined incline angle, wherein the fluid container is operable to at least temporarily contain a drilling or completion fluid;
an inlet port in the fluid container, wherein the inlet port comprises an opening in a top of the fluid container;
a base fluid port in the fluid container;
a particulate port in the fluid container;
at least one plate disposed within the fluid container, wherein the at least one plate is inclined at the pre-determined incline angle;
an excitation element coupled to the fluid container, wherein the excitation element is operable to impart a pre-determined vibratory force on the drilling or completion fluid; and
wherein the pre-determined vibratory force comprises at least one of a shape, an intensity, and a frequency, and wherein the pre-determined vibratory force and the pre-determined incline angle are based, at least in part, on at least one of a rheological characteristic, a particle size, and a density of the drilling or completion fluid.

16. The apparatus of claim 15, wherein the excitation element comprises a vibrating probe at least partially disposed within the fluid container.

17. The apparatus of claim 15, wherein the excitation element comprises a vibrating motor coupled to an exterior surface of the fluid container.

* * * * *